J. V. ROWAN.
VEHICLE BUFFER.
APPLICATION FILED MAR. 16, 1912.

1,071,586.

Patented Aug. 26, 1913.
2 SHEETS—SHEET 1.

Witnesses
Hugh Ott.
R. M. Smith.

Inventor
John V. Rowan
By Victor J. Evans
Attorney

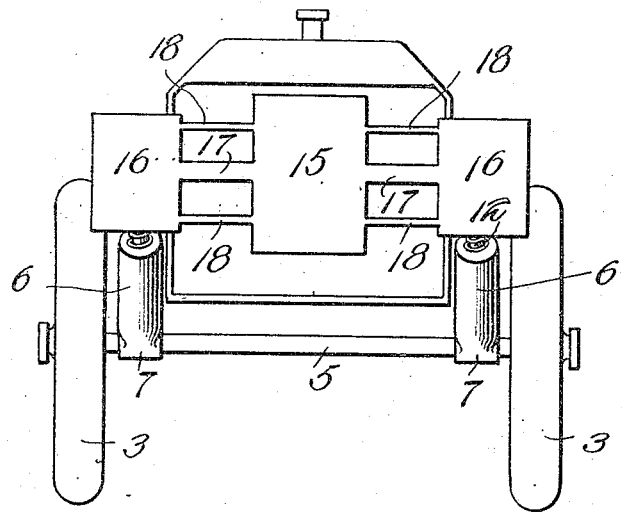
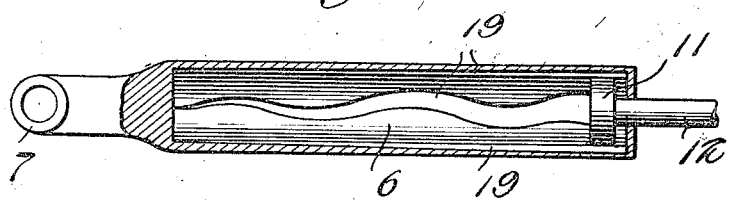
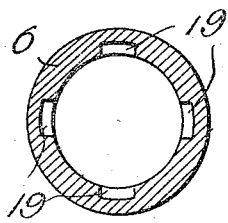

UNITED STATES PATENT OFFICE.

JOHN V. ROWAN, OF FORT STEVENS, OREGON.

VEHICLE-BUFFER.

1,071,586.

Specification of Letters Patent.

Patented Aug. 26, 1913.

Application filed March 16, 1912. Serial No. 684,185.

*To all whom it may concern:*

Be it known that I, JOHN V. ROWAN, a citizen of the United States, residing at Fort Stevens, in the county of Clatsop and State of Oregon, have invented new and useful Improvements in Vehicle-Buffers, of which the following is a specification.

This invention relates to vehicle buffers, and while the invention is especially designed for use upon automobiles, it will be apparent, as the description proceeds, that the invention may be applied to other forms of vehicles, according to necessity.

The object of the invention is to provide an effective buffer or shock absorber for the front of a vehicle, such as an automobile, so that the impact or blow received in a head-on collision will be absorbed, without resulting in serious damage to the vehicle, the shock being taken up with progressively increasing resistance, as will be hereinafter set forth.

With the above and other objects in view, the invention consists in the construction, combination and arrangement of parts, as will be hereinafter more fully described, illustrated in the accompanying drawings, and pointed out in the appended claims.

Figure 1:
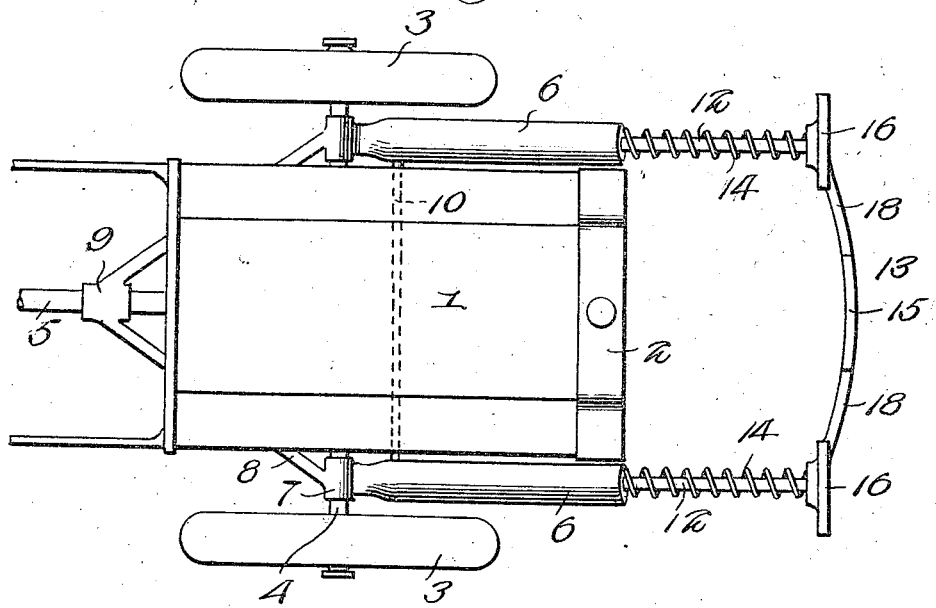
Figure 2:
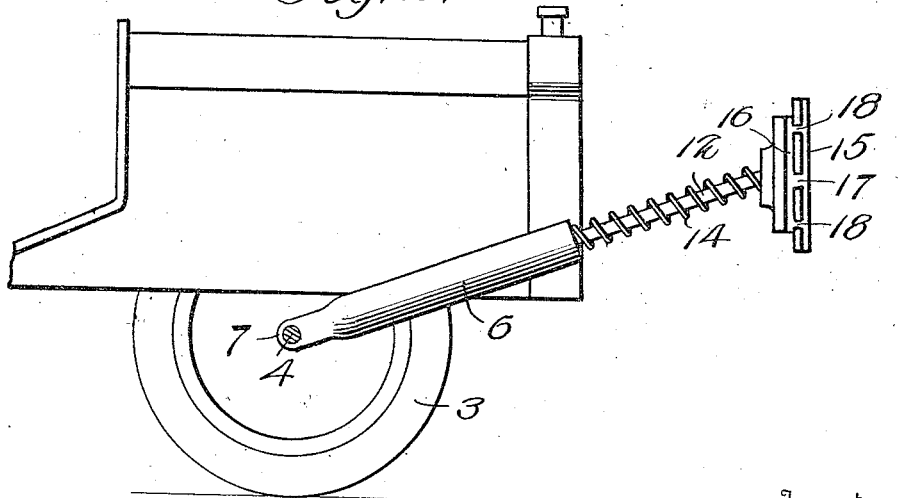

In the accompanying drawings: Figure 1 is a plan view of the forward part of an automobile, illustrating the present invention applied thereto. Fig. 2 is a side elevation of the same. Fig. 3 is a front elevation thereof. Fig. 4 is an enlarged longitudinal section through one of the buffer cylinders. Fig. 5 is a cross section through the same.

In order to illustrate the application of the present invention to an automobile, I have illustrated in the drawings the front portion of an automobile structure, embodying the engine hood 1, radiator 2, steering wheels 3, front axle 4, and reach 5, which in an automobile consists of the driving shaft tube.

In carrying out the present invention, in the preferred embodiment thereof, I employ a pair of cylinders 6 arranged at opposite sides of the engine, as shown for example in Fig. 1, the said cylinders being set at a downward inclination from front to rear, as shown in Fig. 2, so that the blow will be imparted in a backward, and at the same time, a downward direction, whereby the resilient tires of the front wheels will stand a good portion of the shock and assist materially in absorbing the same.

The cylinders 6 are braced at their rear ends by the front axle 4, and a convenient way of accomplishing this is to connect the rear ends of the cylinders to sleeves 7 which embrace the axle 4, as shown in Fig. 1, while from said sleeves 7, rearwardly converging thrust transmission braces 8 extend to a common central collar 9 which fits upon the centrally arranged drive shaft 5 hereinabove referred to. The cylinders are designed to be filled with oil or any suitable liquid which will effectively resist the movement of the pistons mounted therein, and in order to equalize the movement of the liquid an equalizing passage connects the rear ends of said cylinders, said equalizing passage being shown, for convenience, in the form of a pipe 10.

Arranged in each of the cylinders is a piston 11 having a rod 12 extending forward and connecting to one side of an impact head 13. Each of said piston rods is surrounded by a spiral compression spring 14 which, after the blow, restores the impact head to its forward position ready for use.

The impact head 13, as shown in Fig. 3 in the preferred embodiment of the invention, comprises a central section or plate 15 and two side plates or sections 16 connected to the central section by central and relatively large connector bars 17, and at or near the top and bottom by smaller connector bars 18. It will be understood, however, that the form and construction of the impact head may be varied, without departing from the spirit, or sacrificing any advantages of this invention.

In order to enable the pistons 11 to be resisted with progressively increasing force, the inner wall of each of the cylinders is provided with one or more resistance ducts 19, each of which is larger at the outer or forward end of the cylinder and smaller at the inner or rear end thereof, as clearly shown in Fig. 4. It is also preferred to slightly incline the floor of said resistance duct, making the same deeper at the front and shallower at the rear. The object in making the resistance duct in the way just described is to provide for progressively increasing resistance in the passage of the oil or other liquid from the rear toward the front of the cylinder, as the piston is thrust backward therein. By further reference to Fig. 4, it will be noted that the resistance duct is sinuous in shape, the object of which is to cause still greater resistance to the passage of the oil or other liquid lengthwise of said duct, on account of the liquid coming into contact with the deflected edges of the duct, which operates in a measure to check the flow of the liquid and thereby gradually and progressively increase the retardation of the piston, as it moves rearwardly in the cylinder. It will also be observed by reference to Fig. 2 that the piston rods 12 are inclined upwardly toward their forward ends, while the impact head 13 is preferably set vertically edgewise. Thus, as the impact head is thrust rearward, the piston rods 12 and pistons carried thereby move in a downward oblique direction, and by imparting their thrust to the axles, a corresponding thrust is imparted to the tires, and a good portion of the shock is thus transmitted to and absorbed by the pneumatic tires on the front or steering wheels of the automobile.

What is claimed is:

1. A buffer for vehicles, comprising a liquid-containing cylinder braced directly against the front axle of the vehicle and inclining upward and forward therefrom, a piston working in said cylinder and adapted to displace the liquid, and an impact head connected to the piston, the parts being combined and arranged to exert a downward thrust on said axle when in action.

2. A buffer for vehicles, comprising two liquid containing cylinders arranged at opposite sides of the center line of draft, a combined V-shaped brace and guide frame connecting said cylinders at the rear and engaging the axle and reach of the vehicle, pistons working in said cylinders and adapted to displace the liquid, and an impact head connected to the piston rods at their forward ends.

In testimony whereof I affix my signature in presence of two witnesses.

JOHN V. ROWAN.

Witnesses:
  P. J. GLANZ,
  ADOLPH ZAMRSKY.